United States Patent
Wong

[11] Patent Number: 6,158,762
[45] Date of Patent: Dec. 12, 2000

[54] COLLAPSIBLE GOLF CART

[75] Inventor: Jacob Y. Wong, Goleta, Calif.

[73] Assignee: Jaesent Inc., Goleta, Calif.

[21] Appl. No.: 09/460,250

[22] Filed: Dec. 13, 1999

Related U.S. Application Data

[63] Continuation-in-part of application No. 09/241,976, Feb. 1, 1999.

[51] Int. Cl.[7] ........................................ B62B 1/12
[52] U.S. Cl. .......................... 280/652; 248/96; 248/169; 280/47.18; 280/47.2; 280/47.29
[58] Field of Search ........................... 248/96, 98, 155.2, 248/155.5, 169; 280/42, 38, 39, 47.2, 47.3, 47.24, 47.27, 645, 646, 651, 652, 655, 655.1, 62, DIG. 6, 47.18, 47.29

[56] References Cited

U.S. PATENT DOCUMENTS

| | | | |
|---|---|---|---|
| 1,282,105 | 10/1918 | Mowry | 248/155.2 |
| 2,578,989 | 12/1951 | Wirsig | 248/155.2 |
| 2,812,950 | 11/1957 | Holloway | 135/66 X |
| 2,932,526 | 4/1960 | Campbell | 280/47.29 X |
| 3,007,710 | 11/1961 | Sykes | 280/47.29 X |
| 3,058,706 | 10/1962 | Snell | 248/464 X |
| 3,087,535 | 4/1963 | Muller | 248/435 X |
| 3,861,695 | 1/1975 | Shourek et al. | 280/47.29 |
| 5,062,653 | 11/1991 | Deglis et al. | 280/655 |
| 5,568,848 | 10/1996 | Liang | 280/47.2 X |
| 5,755,245 | 5/1998 | Helvoort | 135/66 X |
| 5,788,260 | 8/1998 | Huang | 280/645 |

Primary Examiner—Michael Mar
Attorney, Agent, or Firm—Daniel C. McKown

[57] ABSTRACT

A collapsible golf cart that is capable of carrying a fully-loaded golf bag includes an A-frame formed by telescoping members pivotally connected at their upper ends and having removable wheels at their lower ends. The cart includes a swinging V-shaped support stand that is attached at its upper ends to the telescoping frame members. The swinging lower end of the stand includes a spike extending downward from its front side and includes an auxiliary wheel at its rear side. When the cart is parked, the stand is in its rearmost position and the spike digs into the ground. When the cart is in motion, the stand is swung to a forward position in which the auxiliary wheel rolls on the ground. The spike also provides good electrical grounding for the cart. The cart also includes a telescoping lightning rod, the effectiveness of which is enhanced by the grounding provided by the spike. The main front wheels of the cart are held on their axles by quick-release skewers, which permit removal of the wheels for ease of handling the collapsed cart and which permit easy change to wheels of a different type as appropriate to other uses of the cart, such as carrying luggage.

12 Claims, 6 Drawing Sheets

COLLAPSIBLE GOLF CART

REFERENCE TO RELATED APPLICATION

This is a continuation-in-part of application Ser. No. 09/241,976 filed Feb. 1, 1999 for "Collapsible Luggage Cart" by the present inventor.

BACKGROUND OF THE INVENTION

1. Field of the Invention

The present invention is in the field of two-wheeled carts for transporting a golf bag or similar load. The cart of the present invention is not self-powered, and ordinarily would be pushed or pulled by a human operator.

2. The Prior Art

The present invention will ordinarily be used by golfers to carry a golf bag containing golf clubs, golf balls, tees, towels, and other paraphernalia related to the game. These items add to the tare of the bag, with the result that a fully-loaded bag could weigh about thirty pounds. Because of this weight, many golfers choose to strap the golf bag to a two-wheeled cart which is pushed or pulled about the golf course.

Such carts are generally known, but the present invention has structural features that render it exceptional.

The golf cart of the present invention is collapsible to roughly a third of its size for convenient storage and handling. This is made possible by its ingenious telescoping A-frame structure. Nonetheless, the cart is surprisingly rigid and has adequate strength to carry the largest and heaviest golf bags.

Unlike known golf carts, the cart of the present invention employs a unique gravity-assisted swinging stand that makes it easy to park and to resume travel after having been parked. The operation of the stand is so intuitive that it quickly becomes automatic to the user.

Because golfers traverse large open fields, they may be exposed to the hazard of being struck by lightning. For this reason, the golf cart of the present invention is provided with a removable telescoping lightning rod. If caught in the open by a sudden lightning storm, the golfer can readily erect the lightning rod. The effectiveness of the lightning rod is enhanced by the grounding action of the swinging stand.

Finally, the wheels of the golf cart are retained to their axles by quick-release skewers that permit the wheels to be quickly removed for ease of handling and storage and to permit other wheels to be substituted.

Because the golf cart of the present invention is so unusual, it was not surprising that a search of the prior art failed to discover anything similar.

The closest prior art is believed to be U.S. Pat. No. 3,861,695 issued Jan. 21, 1975 to Shourek et al. They show a cart having left and right telescoping members and arms pivotally attached to the lower portion of those members to permit the arms to be swung from a forwardly extending position upwardly to a position adjacent the telescoping member. The left and right telescoping members are interconnected by jointed jack-knifing cross members that extend as the telescoping members are drawn apart laterally. The cross members keep the telescoping members parallel at all times as they are being drawn from their collapsed configuration to their extended configuration. In order to achieve this, the cross members must necessarily be able to pivot with respect to the telescoping members. Accordingly, the cart must be somewhat lacking in rigidity, a problem which the present invention solves through the use of a more robust A-frame structure.

Also, in the cart of Sourek et al., when the arms are folded up, they assume a position adjacent the lower sections of the telescoping members. In contrast, in the present invention, the arms fold into the lower section of the telescoping members, where they remain concealed.

U.S. Pat. No. 5,062,653 issued Nov. 5, 1991 to Deglis et al. might also arguably be relevant. That patent shows a recreational cart having left and right telescoping members and two wheels. This cart can be distinguished from the present invention by the fact that the telescoping arms remain parallel at all times, and the wheel axles are connected by the body of the cart and thus cannot be separated laterally as in the cart of the present invention.

The present inventor has aspired to invent a collapsible golf cart having a minimal structure so as to provide the required strength and rigidly with minimum weight. In its collapsed condition, the cart of the present invention has an aesthetically-pleasing shape and is convenient to carry and handle.

SUMMARY OF THE INVENTION

A major objective of the present invention is to provide a golf cart that is strong and rigid when in use, and that can be collapsed into a configuration that is aesthetically pleasing and easily carried.

In accordance with the present invention, this is accomplished by pivotally connecting the top section of a left telescoping member to the top section of a right telescoping member so that when the members are extended, their lower ends can be swung apart to form an A-frame structure that is extremely rigid. Upwardly swingable arms are pivoted to the lowest sections of the telescoping members, and the arms swing into the members when the cart is collapsed, whereby the arms are substantially concealed within the lowest sections when the cart is collapsed.

In accordance with the present invention, when the cart is to be collapsed, the golf bag support arms are swung upwardly to a position inside the lowest section of the telescoping members, the lower ends of the telescoping members are then pushed together until they are side by side, and finally, the telescoping members are collapsed into their lowest sections. As a result, in its collapsed configuration, the entire cart, accept for the wheels, is enclosed within the lower sections of the telescoping members. An aesthetically-pleasing appearance is produced by imparting a desired shape and surface ornamentation to the external surfaces of the lowest sections of the left and right telescoping members.

In accordance with the present invention the collapsible golf cart is provided with a swingable stand that permits the golf cart to be parked in an upwardly inclined attitude during use. The stand has a triangular shape and is formed by left and right support legs that are pivotally attached at their proximal ends to the left and right telescoping members, respectively. The distal ends of the support legs are joined by a connector that includes both a spike and an auxiliary wheel. Accordingly the distal end of the stand can be swung rearward and upward from an "in motion" position near the wheels of the golf cart to a "parked" position almost perpendicular to the telescoping members. The spike is located on the front of the stand and the auxiliary wheel is located on the back of the stand. Their relative positions permit the distal end of the stand to roll on the auxiliary wheel when the cart is being moved and permit the spike to dig into the ground when the cart is parked. A cable limits the rearward motion of the stand.

The operation of the stand requires no care or thought by the user; it is as automatic and dependable as gravity itself, on which its operation is based. To park the cart, the user simply lifts the handle located at the upper end of the cart. Gravity causes the stand to swing rearward (away from the front wheels) so as to keep the stand approximately vertical, but its inertia carries the stand rearward past vertical. Then the user lowers the handle. The spike digs into the ground and the front wheels of the cart relax forward slightly as the handle continues to be lowered. The cable limits this motion, leaving the cart in an upwardly-inclined parked configuration.

To make the transition from "parked" to "in motion" the user lifts the handle, thereby extracting the spike from the ground and permitting the stand to swing forward. Inertia carries the stand forward (toward the front wheels) past vertical. Then the user lowers the handle causing the auxiliary wheel at the distal end of the stand to contact the ground. As the cart is pushed or pulled, the distal end of the stand rolls on the auxiliary wheel and maintains a position near but slightly behind the front wheels of the cart. The auxiliary wheel prevents the distal end of the cart from plowing into the ground when the cart is pushed and avoids the scraping noise that would be produced in its absence when the cart is pushed or pulled along a hard surface.

In accordance with the present invention the spike at the distal end of the stand serves another important function; namely, to provide electrical grounding of the golf cart. Each year several dozen golfers are struck by lightning. Typically, golfers strongly wish to finish the game once it is underway, but sometimes they are overtaken by sudden storms. Caught in an exposed position, the golfer becomes vulnerable to a lightning strike.

To provide some degree of protection, the golf cart of the present invention is provided with a removable lightning rod that is connected both mechanically and electrically to an upper portion of the golf cart. The lightning rod has a telescopic structure, like an automobile antenna, and when fully extended extends to a height of 10 feet above the ground. This provides a circle of safety large enough to protect the golfer, who should preferably lie on the ground. Although lightning can jump modest distances between conductors, it much prefers a direct conductive path. The effectiveness of the lightning rod is much enhanced by the grounding effect of the spike at the distal end of the stand.

In another aspect of the preferred embodiment of the golf cart, the main front wheels of the cart are removable from their axles. This permits the remainder of the golf cart to be collapsed into a smaller package separate from the wheels. It also permits rapid replacement of the wheels by a set of wheels having a different diameter or different structure; for example, large diameter balloon tires can quickly be replaced by smaller and lighter solid tires, as appropriate for alternative uses of the golf cart.

In the preferred embodiment removability of the wheels is achieved by using hollow axles into which a quick-release skewer slides and latches. The skewer has an enlarged head that does not enter the axle and that prevents the wheel from coming off the axle. To permit the wheel to be removed, a release button on the head of the skewer must be depressed while the skewer is being withdrawn from the axle.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
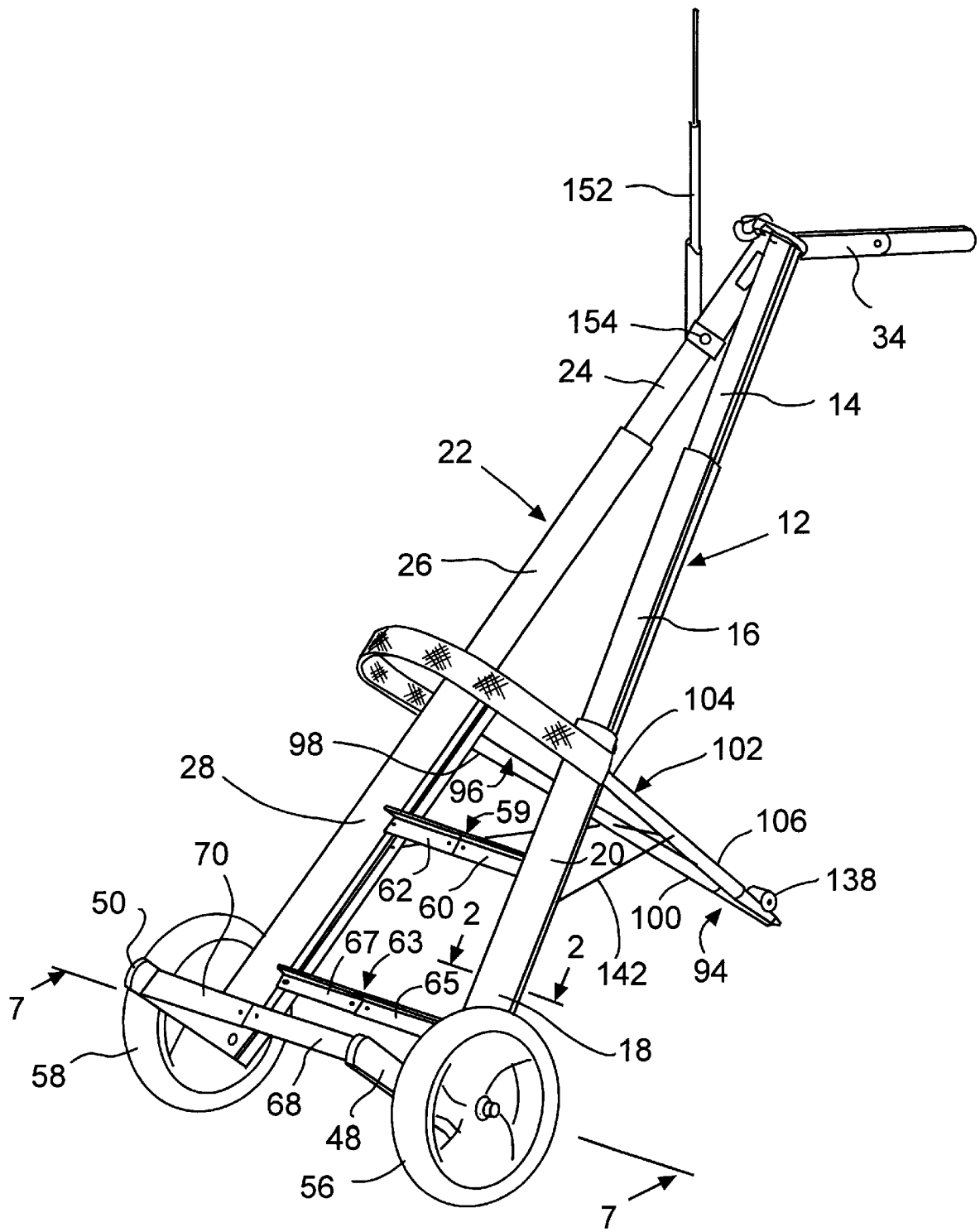
FIG. 1 is a top front left perspective view of a preferred embodiment of the collapsible golf cart of the present invention.

FIG. 1 is a perspective view showing a preferred embodiment of the golf cart of the present invention. Immediately apparent is the A-frame formed by the left telescoping member 12, the right telescoping member 22 the collapsible back brace 59 formed by the left back brace member 60 and the right back brace member 62, and the collapsible back brace 63 formed by the left back brace member 65 and the right back brace member 67. This structure results in improved rigidity and strength.

The left telescoping member 12 includes a left top section 14, a left intermediate section 16 and a left bottom section 18. In the preferred embodiment, the exterior surface 20 of the left bottom section is ornamented.

The right telescoping member 22 includes a right top section 24, a right intermediate section 26 and a right bottom section 28. The exterior surface of the right bottom section is ornamented like the surface 20.

The left and right top sections 14 and 24 are slidably received by the left and right intermediate sections 16 and 26. Likewise, the left and right intermediate sections 16 and 26 are slidably received into the left and right bottom sections 18 and 28. The left top section 14 is pivotally connected to the right top section 24. A handle 34 is also provided.

Although the telescoping members 12 and 22 include three sections in the preferred embodiment of FIG. 1, the present invention embraces the situation where the telescoping members include only a top section and a bottom section. Also included is the possibility that the telescoping members may include more than three sections, as determined by the ratio of the extended length to the collapsed length. Regardless of the number of telescoping sections, they are all received within the bottom sections when the cart is collapsed.

A left arm 48 is pivotally attached to the left bottom section 18, and a right arm 50 is pivotally attached to the right bottom section 28. The arms 48 and 50 extend forwardly from the left and right bottom sections 18 and 28 when the cart is in use. Indentations or slots in the exterior surfaces permit the arms to be pivoted into bottom sections 18 and 28. Downward swinging motion of the arm 50 is arrested when a portion 72 of the arm 50 (best seen in FIG. 8) comes into contact with a shoulder on the right bottom section 28.

A left wheel 56 is mounted on a left axle that extends laterally from the left bottom section 18. Similarly, a right wheel 58 is mounted on a right axle 54 attached to the right bottom section 28.

Figure 7:
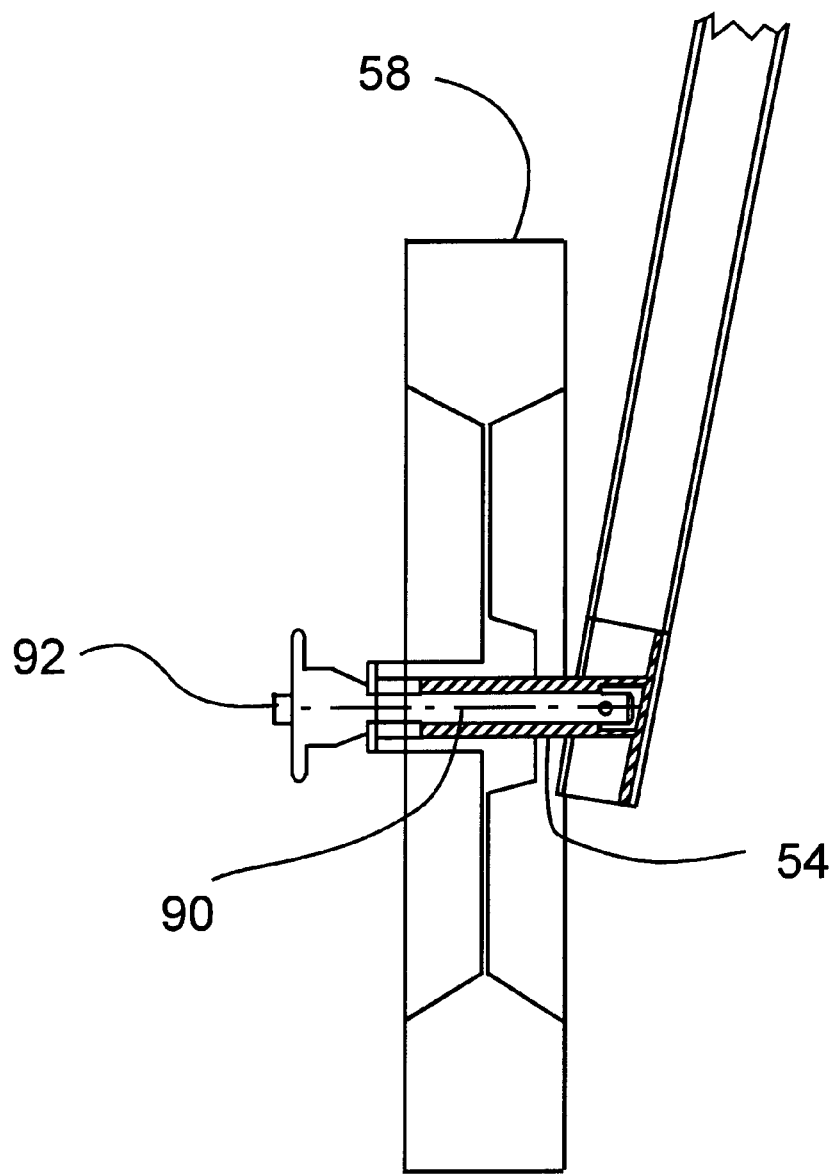
FIG. 7 is a fractional front elevational cross sectional view in the direction 7—7 indicated in FIG. 1 showing the removable wheel used in the preferred embodiment; and, FIG. 8 is a fractional top front left perspective view showing a front portion of the collapsible golf cart.

As best seen in FIG. 7, the right axle 54 is hollow. The wheel 58 is retained on the axle 54 by a quick-release skewer 90 that is inserted into the hollow axle 54 where it latches. A pushbutton 92 on the skewer unlatches the quick-release skewer, permitting it to be withdrawn from the axle, so that the wheel 58 can be removed. The user may decide to remove the wheel so that the collapsed cart will present a smaller package; or, the user may wish to replace the wheel with a wheel that is more appropriate for a non-golf use of the cart. For example, the cart can also be used as a luggage cart or as a shopping cart.

In one variation of the invention, the wheel 56 and the arm 48 are mounted on a common axle and likewise the wheel 58 and the arm 50 are mounted on a common axle. In other embodiments, the axle of the arm 48 may be offset from the axle of the wheel 56.

The golf cart shown in FIG. 1 is collapsed in the following manner. First, the arms 48 and 50 are swung upward until they are within and aligned with the bottom sections 18 and 28. Next, the left and right back brace members 60, 62, 65 and 67 are swung upward as the telescoping members 12 and 22 are pushed together. Finally, the telescoping members are collapsed by pushing downward on the handle 34. It is seen that the telescoping members move simultaneously and equally in response to pushing down or pulling up of the handle 34.

Figure 2:
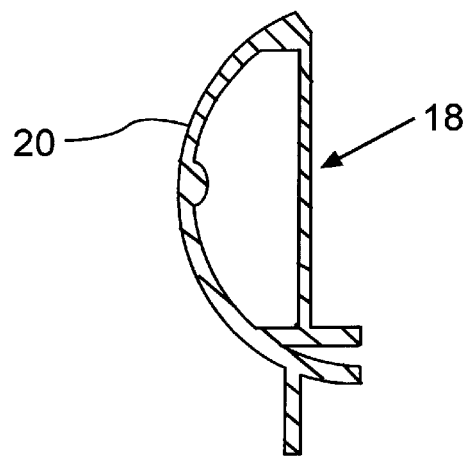
FIG. 2 is a cross sectional view of the left bottom section of the left telescoping member in the direction 2—2 indicated in FIG. 1.

FIG. 2 shows a cross section through the left bottom section 18. The exposed surface 20 has a semi-cylindrical shape, and along with the corresponding surface of the right bottom section 28 substantially conceals the cart when it is in the collapsed configuration.

Figure 8:
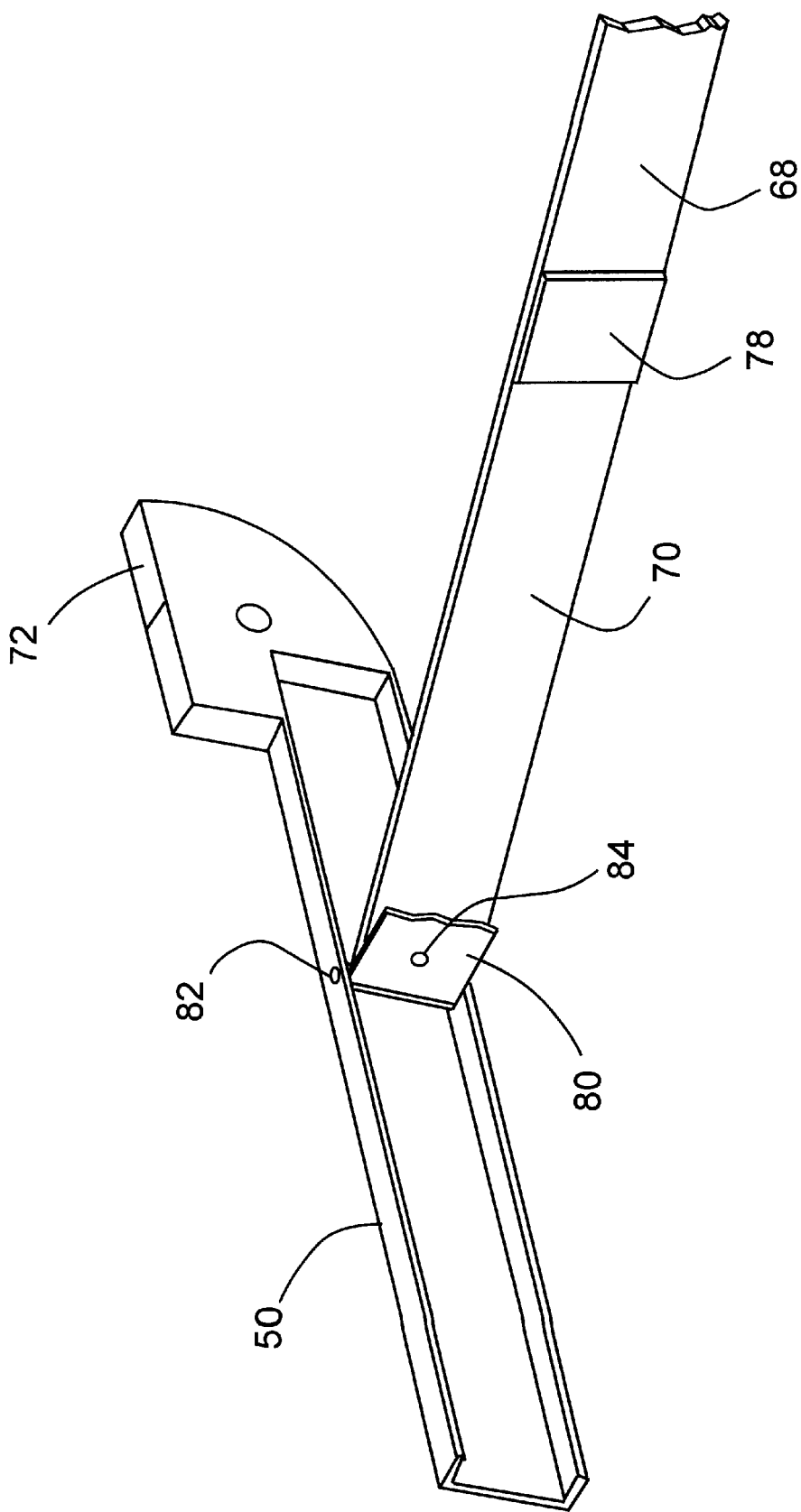

After the left and right telescoping members 12 and 22 have been spread to the positions shown in FIG. 1, the arms 48 and 50 are swung out of the lowest sections 18 and 28 and swung downward to the positions shown in FIG. 1. It will be recognized that the arms are moved in different inclined planes. This necessitated a special design, shown in FIG. 8, for the lateral arm brace that includes the left arm brace member 68 and the right arm brace member 70. These members 68 and 70 are hinged together by the hinge 78, which permits the arm brace to fold in half as the telescoping members 12 and 22 are pushed together. However, because the arms 48 and 50 swing in different inclined planes, the member 70 is pinned to the plate 80 by the pin 84, and the plate 80 is pivotally connected to the arm 50 by the pin 82. FIG. 8 correctly shows that the right arm brace member 70 lies flush against the plate 80 but is rotated with respect to it about the pin 84 due to the angle between the telescoping members 12 and 22. A similar connection is used at the left end of the arm brace.

One of the more notable features of the golf cart is the swingable stand 94 of FIG. 1. The swingable stand 94 is formed by a right support leg 96 that has a proximal end 98 and a distal end 100, and a left support leg 102 that has a proximal end 104 and a distal end 106.

Figure 4:
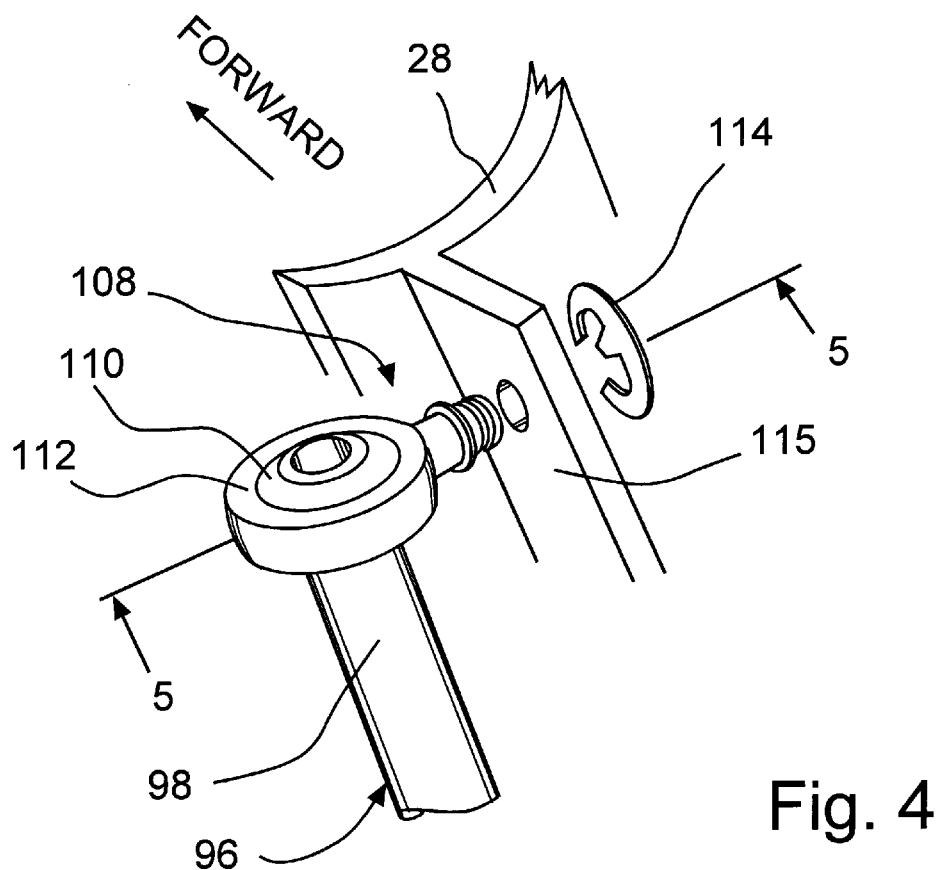
FIG. 4 is a fractional top rear left view of the upper portion of the right bottom section of the right telescoping member in the preferred embodiment.
Figure 5:
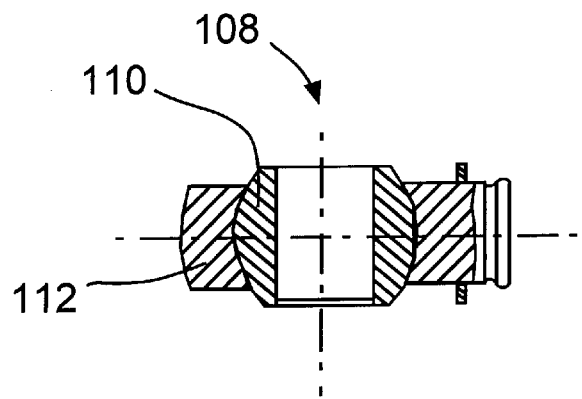
FIG. 5 is a cross sectional view in the direction 5—5 indicated in FIG. 4 showing the structure of the pivot joint shown in FIG. 4.

As best seen in FIG. 4, the proximal end 98 of the right support leg 96 is pivotably connected to the right bottom section 28 by a modified form of ball-and-socket joint 108, also referred to as a rod end type pivot. This type of joint permits the right support leg 96 to pivot laterally as the left and right telescoping members 12 and 22 are swung apart and together. Additionally, the joint permits the right support leg to swing in the longitudinal direction as suggested in FIG. 6. The joint includes a ball portion 110 and a socket portion 112 as shown in FIGS. 4 and 5. The joint is retained to the flange 115 by means of an E-clip 114. In an alternative embodiment the joint 108 is replaced by a pivotally-mounted yoke.

Figure 3:
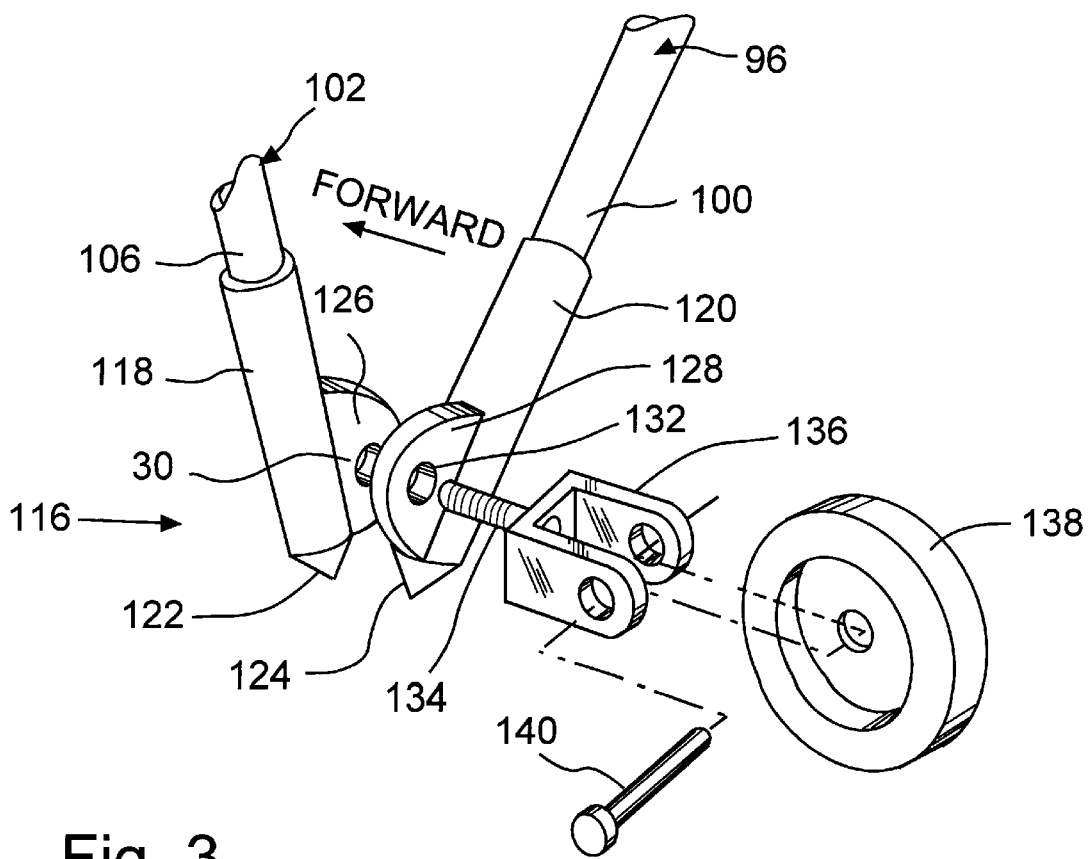
FIG. 3 is a fractional top rear left perspective view showing the distal end of a stand used in the preferred embodiment.

As best seen in FIG. 3, the distal end 106 of the left support leg 102 and the distal end 100 of the right support leg 96 are joined by a connector assembly designated generally as 116. The distal end 106 of the left support leg extends into and is retained by the ferrule 118, and the distal end 100 of the right support leg 96 extends into and is retained by the ferrule 120. In the preferred embodiment, the ferrules 118 and 120 terminate in spikes 122 and 124 respectively. An ear 126 extends laterally from the ferrule 118, and an ear 128 extends laterally from the ferrule 120. The ears 126 and 128 are parallel to each other, and contain holes 130 and 132 respectively that register when the ferrules are brought together. A bolt 134 connects the yoke 136, the ear 128 and the ear 126. An auxiliary wheel 138 is mounted for rotation on an axle 140 that extends through the yoke 136. This way of connecting the support legs 96 and 102 is necessary to accommodate the opening and closing of the left and right telescoping members 12 and 22. The rearward swinging of the swingable stand 94 is limited by the arresting cable 142 of FIG. 1. A chain could be used in place of the cable.

Figure 6:
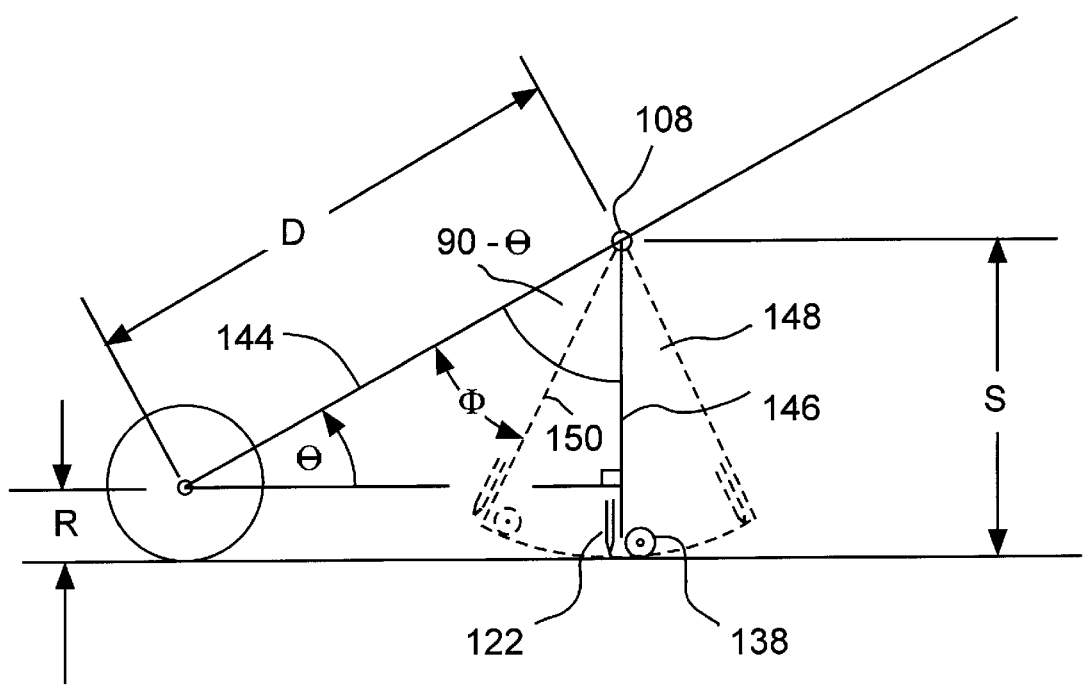
FIG. 6 is a diagram showing geometric relations inherent in the cart of FIG. 1.

The operation of the spikes 122 and 124 of FIG. 3 and of the auxiliary wheel 138 can be better understood by reference to FIG. 6, which is a left side elevational view of the cart. In the diagram of FIG. 6, the lateral projection of the left telescoping member 12 is represented by the line 144, and the lateral projection of the left support leg 102 is represented by the line 146. In the preferred embodiment, the tip of the spike 122 and the rim of the wheel 138 are approximately the same distance from the joint 108. The dashed lines in FIG. 6 show different possible positions of the swingable stand 94 of FIG. 1.

When the cart is to be parked, the swingable stand is swung to the position indicated by the dashed line 148, and then the handle of the cart is lowered, causing the tip of the spike to dig into the ground. When the cart is to be moved, either pushed or pulled, the swingable stand is brought to the position indicated by the dashed line 150 and then the handle of the cart is lowered bringing the auxiliary wheel 138 into contact with the ground. From the diagram of FIG. 6, it can be seen that the auxiliary wheel will contact the ground when $\Phi$ is less than 90 degrees minus $\theta$ and the spike will contact the ground when $\Phi$ is greater than 90 degrees minus $\theta$, where $\Phi$ is the angle between the lateral projection of the telescoping members and the lateral projection of the support legs. The operation of the support stand is described above in the Summary.

As best seen in FIG. 1, a removable telescoping lightning rod 152 can be attached to one of the telescoping members of the golf cart to provide a degree of protection to golfers who are caught in the open by a sudden unexpected lightning storm. The lightning rod is preferably bolted to the telescoping member by a bolt 154. The spikes 122 and 124 of FIG. 3 serve to ground the golf cart electrically, thereby enhancing the effectiveness of the lightning rod 152.

Thus, there has been described a collapsible golf cart having minimal structure, which makes it light in weight for ease of caring. Portability is further enhanced by the manner in which the cart collapses into a small tubular configuration in which the parts of the cart are enclosed by the external surfaces of the lowest sections of the telescoping members. These surfaces are ornamented to give the collapsed cart an attractive appearance.

A simple three step procedure is used for deploying the cart from its collapsed configuration to its ready-to-use configuration. First, the telescoping members are extended by pulling upwardly on a handle. Next, the lower ends of the telescoping members are spread apart, the telescoping members remaining pinned together at their upper ends. Finally, the left and right arms are swung forward and downward from their concealed position within the lower ends of the telescoping members until they extend forward and approximately perpendicular to the telescoping members which serve as the back of the cart.

Thus, there have been described a preferred embodiment of a collapsible cart and several alternative embodiments and variations of it. Additional variations which would be apparent to workers in the field are considered to be encompassed within the present invention, which is defined by the following claims.

What is claimed is:

1. A collapsible golf cart comprising:
    a left telescoping member including a left top section and a left bottom section, the left bottom section adapted to receive the left top section when said left telescoping member is collapsed, and including a left wheel rotatably attached to a lower end of the left bottom section, the left bottom section having an exterior surface;
    a right telescoping member including a right top section and a right bottom section, the right bottom section adapted to receive the right top section when said right telescoping member is collapsed, and including a right wheel rotatably attached to a lower end of the right bottom section, the right bottom section having an exterior surface;
    pivot means coupling the left top section to the right top section for enabling said left telescoping member to pivot with respect to said right telescoping member and for connecting said left telescoping member and said right telescoping member for equal and simultaneous linear movement as they are moved between extended and collapsed positions;
    the exterior surface of the left bottom section and the exterior surface of the right bottom section being adapted to assume a substantially tubular configuration while in the collapsed position;
    a right support leg having a proximal end and a distal end;
    means for pivotally connecting the proximal end of said right support leg to the right bottom section of said right telescoping member;
    a left support leg having a proximal end and a distal end;
    means for pivotally connecting the proximal end of said left support leg to the left bottom section of said left telescoping member; and,
    connector means for pivotally connecting the distal end of said right support leg to the distal end of said left support leg;
    said connector means further including a distally-directed spike, an auxiliary wheel, and an axle for rotatably supporting the auxiliary wheel;
    whereby said left support leg, said right support leg and said connector means constitute a swingable stand for the collapsible golf cart with either the distally-directed spike immobilizing the collapsible golf cart or the auxiliary wheel rotatably supporting the collapsible golf cart depending upon a selected angular position of the swingable stand relative to the left and right telescoping members while in their extended position.

2. The collapsible golf cart of claim 1 wherein said distally-directed spike and said auxiliary wheel extend approximately equally far in the distal direction,
    whereby when the lateral projection of said left and right telescoping members is inclined to the ground by an angle $\theta$, said auxiliary wheel will contact the ground when $\Phi$ is less than 90 degrees minus $\theta$ and said distally-directed spike will contact the ground when $\Phi$ is greater than 90 degrees minus $\theta$, where $\Phi$ is the angle between the lateral projection of said left and right telescoping members and the lateral projection of said left and right support legs.

3. The collapsible golf cart of claim 2 further comprising arresting means attached to said left telescoping member and to said right telescoping member for limiting the pivotal movement of said left support leg and of said right support leg to prevent $\Phi$ from exceeding a specific maximum angle.

4. The collapsible golf cart of claim 1 wherein said connector means further include a caster on which said auxiliary wheel and its axle are mounted and wherein said distally-directed spike and said auxiliary wheel extend approximately equally far in the distal direction,
    whereby when the lateral projection of said left and right telescoping members is inclined to the ground by an angle $\theta$, said auxiliary wheel will contact the ground when $\Phi$ is less than 90 degrees minus $\theta$ and said distally-directed spike will contact the ground when $\Phi$ is greater than 90 degrees minus $\theta$, where $\Phi$ is the angle between the lateral projection of said left and right telescoping members and the lateral projection of said left and right support legs.

5. The collapsible golf cart of claim 4 further comprising arresting means attached to said left telescoping member and to said right telescoping member for limiting the pivotal movement of said left support leg and of said right support leg to prevent $\Phi$ from exceeding a specific maximum angle.

6. The collapsible golf cart of claim 1 further comprising means for attaching a lightning rod to an upper portion of the golf cart.

7. The collapsible golf cart of claim 1 wherein the exterior surface of the left bottom section has a convex semi-cylindrical portion facing away from said right telescoping member, and wherein the exterior surface of the right bottom section has a convex semi-cylindrical portion facing away from said left telescoping member.

8. The collapsible golf cart of claim 1 further comprising:
    a handle connected to said pivot means and extending above said pivot means, whereby said left telescoping member and said right telescoping member may be extended equally and simultaneously by pulling upward on said handle.

9. The collapsible golf cart of claim 1 further comprising:

a left arm;

a right arm;

means pivotally connecting said left arm to the left bottom section for rotation from a forwardly-extending direction when the golf cart is in use to a direction substantially aligned with the left bottom section when the golf cart is collapsed; and, means pivotally connecting said right arm to the right bottom section for rotation from a forwardly-extending direction when the golf cart is in use to a direction substantially aligned with the right bottom section when the golf cart is collapsed;

wherein the left bottom section is adapted to receive and conceal said left arm when the golf cart is collapsed, and wherein the right bottom section is adapted to receive and conceal said right arm when the golf cart is collapsed.

10. The collapsible golf cart of claim 1 further comprising:

a left axle extending laterally from the left bottom section; and, a right axle extending laterally from the right bottom section and separated from said left axle when the golf cart is in use.

11. The collapsible golf cart of claim 10 wherein said left axle and said right axle are hollow.

12. The collapsible golf cart of claim 11 further comprising:

a left skewer extending into said left axle for removably retaining said left wheel on said left axle; and, a right skewer extending into said right axle for removably retaining said right wheel on said right axle.

* * * * *